H. NAGEL.
WEED DESTROYER.
APPLICATION FILED APR. 3, 1916.
1,200,967.
Patented Oct. 10, 1916.
FIG_1_
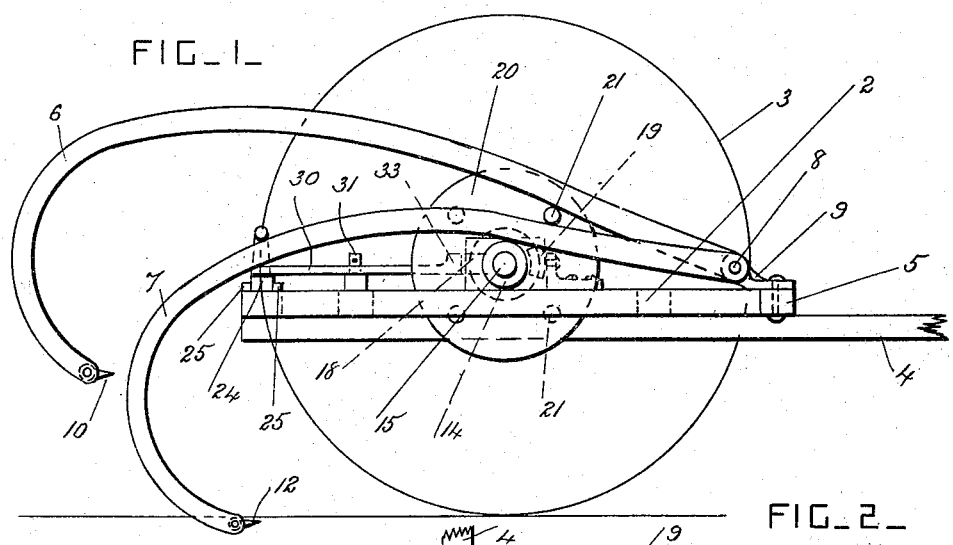
FIG_2_
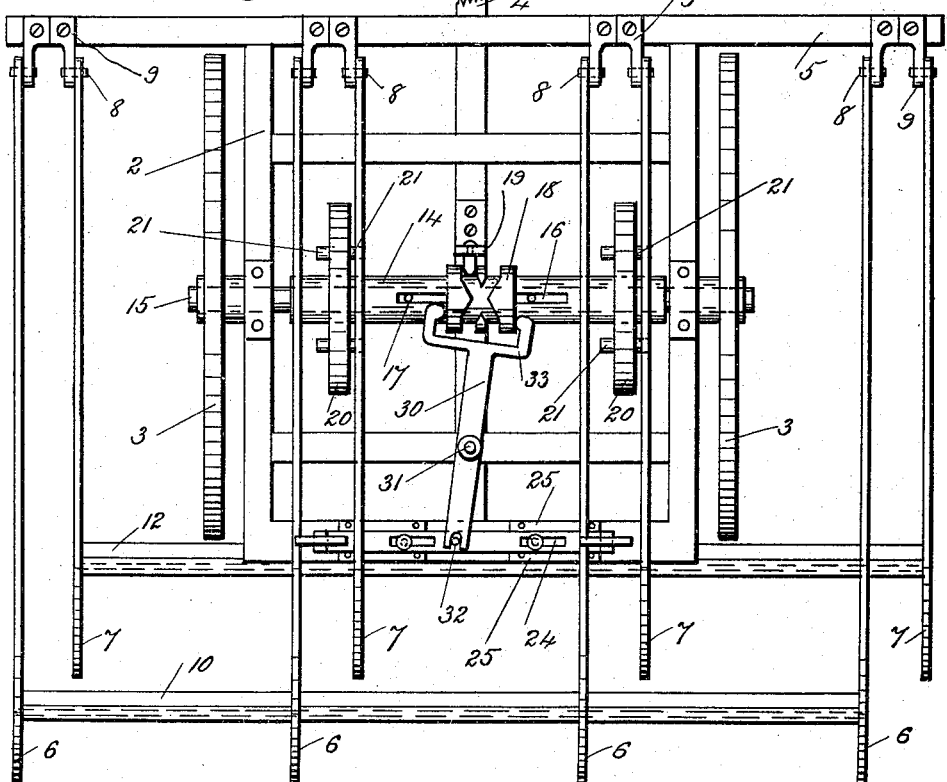
FIG_3_
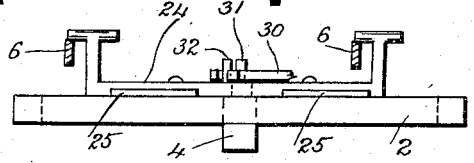
Inventor
Henry Nagel
by Herbert W. S. Jenner.
Attorney

UNITED STATES PATENT OFFICE.

HENRY NAGEL, OF RITZVILLE, WASHINGTON.

WEED-DESTROYER.

1,200,967.   Specification of Letters Patent.   Patented Oct. 10, 1916.

Application filed April 3, 1916. Serial No. 88,530.

*To all whom it may concern:*

Be it known that I, HENRY NAGEL, a citizen of the United States, residing at Ritzville, in the county of Adams and State of Washington, have invented certain new and useful Improvements in Weed-Destroyers; and I do hereby declare the following to be a full, clear, and exact description of the invention, such as will enable others skilled in the art to which it appertains to make and use the same.

This invention relates to machines for destroying weeds in land that has been plowed and harrowed or otherwise prepared for seed. In such land the surface ground is loose and soft, and weeds spring up in it quickly, and it is of great advantage to destroy them before sowing the grain seed.

This invention consists in the novel construction and combination of the parts forming a machine, which can be drawn over the ground to destroy the weeds, as hereinafter fully described and claimed.

In the drawings, Figure 1 is a side view of a machine constructed according to this invention. Fig. 2 is a plan view of the same. Fig. 3 is an end view of the locking mechanism.

A frame 2 is provided and is mounted on ground wheels 3. A suitable draft pole 4, or other draft attachment, is connected to the frame, and the front bar 5 of the frame is arranged to project past the ground wheels. Two series of arms 6 and 7 are provided, and these arms are pivoted to the front bar 5 by pins 8 and brackets 9. Each series of arms has two of its arms arranged to project rearwardly over the frame between the ground wheels. The remaining arms are arranged outside the frame and beyond the ground wheels, and as many arms as desirable are provided according to the size of the machine. All the arms 6 and 7 are curved to what is called a "gooseneck" shape.

The arms 6 have a cutter-bar or knife 10 secured to their free ends, and the arms 7 have a similar cutter-bar or knife 12. The arms 6 are longer than the arms 7, and the two knives are arranged parallel to each other and at a suitable distance apart. The knives or cutter-bars are rigidly secured to the arms with their cutting edges projecting forwardly so as to engage with the weed stalks.

When a knife is dropped on the ground it sinks a little into the soft soil, and as the machine is drawn along it cuts and tears away the weeds. The two knives are raised and lowered alternately as the machine is drawn along, so that the weeds which catch on them may be removed periodically when each knife is raised and is clear of the ground. A sleeve 14 is mounted to slide longitudinally on the middle part of the axle 15 which carries the ground wheels. This axle is revolved by one of the ground wheels as the machine is drawn forwardly, and the sleeve 14 has longitudinal slots 16 which engage with pins 17 on the axle so that the sleeve is revolved by the axle. The sleeve is slid back and forth longitudinally by means of a grooved cam 18 which is secured on the middle part of the sleeve, and which engages with a stationary switch-block 19 which is pivoted in a bracket secured to the frame 2. The end portions of the sleeve 14 have disks 20 secured on them, and each disk has laterally projecting pins 21 for raising the curved arms 6 and 7 alternately. The sleeve forms a stop for the arms when in their lowest positions. As many pins 21 as desirable are provided, and when the pins raise the arms 6, the arms 7 are clear of the pins on the other side of the disks so that the arms 7 are not raised until the cam slides the sleeve and disks into a suitable position, and the arms 6 are clear of the pins pertaining to them. A slidable stop-bar 24 is provided and is mounted to slide on the rear bar of the frame. Guides 25 are provided for holding the bar 24 in place. This stop-bar 24 is slid back and forth so as to overlap the middle arms 6 and 7 alternately. When the arms 6 descend the stop-bar 24 is slid over them so that they cannot rise until it is time for the arms 7 to descend and be locked in their turn. The stop-bar 24 is slid back and forth by means of a lever 30 which is pivoted to the frame by a pin 31. The rear end portion of the lever 30 is pivoted to the stop-bar by a pin 32, and its front end portion is provided with a fork 33 which engages with the cam 18. The cutter bars or knives are raised and lowered alternately as the machine is drawn along, and the cutter-bars or knives are locked and released alternately, so that the cutter-bar or knife which is lowered cannot rise out of the ground until the other cutter-bar or knife has descended, and so as to prevent there being any gap or break in the action of the knives.

What I claim is:

1. In a weed destroyer, a supporting frame, arms having their front ends pivotally connected to the frame and having weed-cutting devices at their rear ends which are spaced apart longitudinally, means for raising the front and rear weed-cutting devices alternately as the frame is drawn along, and locking mechanism which operates to prevent the weed-cutting devices from being raised prematurely by contact with obstructions when in their lowest positions.

2. In a weed destroyer, a wheeled frame, arms having their front ends pivoted to the frame and provided at their rear ends with spaced cutter-bars arranged crosswise of the frame, means for raising and lowering the said cutter-bars alternately as the machine is drawn along, and locking mechanism operating automatically to hold the cutter-bars alternately in engagement with the ground.

3. In a weed destroyer, a wheeled frame, arms having their front ends pivoted to the frame and provided at their rear ends with spaced cutter-bars arranged crosswise of the frame, an axle, a sleeve slidable longitudinally on the axle, means for revolving and sliding the sleeve as the machine is drawn along, and disks provided with projections, said disks being secured on the said sleeve and said projections engaging with the said arms so that the said cutter-bars are raised and lowered alternately.

4. In a weed destroyer, a wheeled frame, arms having their front ends pivoted to the frame and provided at their rear ends with spaced cutter-bars arranged crosswise of the frame, an axle, a sleeve slidable longitudinally on the axle, means for revolving and sliding the sleeve as the machine is drawn along, disks provided with projections, said disks being secured on the said sleeve and said projections engaging with the said arms so that the said cutter-bars are raised and lowered alternately, a locking-bar for holding the said cutter-bars alternately in engagement with the ground, and a pivoted lever arranged between the said sleeve and locking bar and operating to slide the locking-bar back and forth in the reverse direction from the said sleeve.

5. In a weed destroyer, a frame, an axle journaled in the frame, ground wheels for supporting the frame and revolving the axle as the machine is drawn along, a sleeve slidable longitudinally on the axle and revolving with it, a grooved cam secured on the said sleeve, a stationary switch-block engaging with the grooved cam, and disks secured to the said sleeve and provided with projections which engage with the said arms and raise and lower the cutter-bars alternately.

In testimony whereof I have affixed my signature.

HENRY NAGEL.